(12) United States Patent
Kamau et al.

(10) Patent No.: US 10,955,104 B2
(45) Date of Patent: Mar. 23, 2021

(54) LIGHTING APPARATUS FOR VEHICLES

(71) Applicant: HELLA GMBH & CO. KGAA, Lippstadt (DE)

(72) Inventors: Edwin N. Kamau, Bonn (DE); Daniela Karthaus, Lippstadt (DE); Alfons Michaelis, Borchen (DE); Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/831,013

(22) Filed: Mar. 26, 2020

(65) Prior Publication Data
US 2020/0224845 A1 Jul. 16, 2020

Related U.S. Application Data

(63) Continuation of application No. PCT/EP2018/075038, filed on Sep. 17, 2018.

(30) Foreign Application Priority Data

Sep. 26, 2017 (DE) ...................... 10 2017 122 213.8

(51) Int. Cl.
*F21S 41/20* (2018.01)
*F21S 41/24* (2018.01)
*F21S 41/125* (2018.01)
*G02B 5/02* (2006.01)

(52) U.S. Cl.
CPC ........... *F21S 41/285* (2018.01); *F21S 41/125* (2018.01); *F21S 41/24* (2018.01); *G02B 5/0252* (2013.01)

(58) Field of Classification Search
None
See application file for complete search history.

(56) References Cited

U.S. PATENT DOCUMENTS

| 5,495,227 A | 2/1996 | Wreede et al. |
| 9,829,858 B2 | 11/2017 | Christmas et al. |
| 10,061,266 B2 | 8/2018 | Christmas |

(Continued)

FOREIGN PATENT DOCUMENTS

| DE | 102006030503 A1 | 1/2008 |
| DE | 102011051735 A1 | 3/2012 |

(Continued)

OTHER PUBLICATIONS

International Search Report dated Jan. 4, 2019 in corresponding application PCT/EP2018/075038.

*Primary Examiner* — Elmito Breval
(74) *Attorney, Agent, or Firm* — Muncy, Geissler, Olds & Lowe, P.C.

(57) ABSTRACT

A lighting apparatus for vehicles with a housing sealed by a transparent covering panel, containing a light source unit and an optical unit for producing a predetermined light function, wherein the optical unit has a hologram element and/or diffractive element in which diffraction information for producing the light function is contained, wherein optics are disposed downstream of the hologram element and/or the diffractive element in the light beam path, so that light of different orders of diffraction emerging from the hologram element and/or the diffractive element produce different light functions.

10 Claims, 1 Drawing Sheet

(56) References Cited

U.S. PATENT DOCUMENTS

| | | |
|---|---|---|
| 10,061,267 B2 | 8/2018 | Christmas |
| 10,061,268 B2 | 8/2018 | Christmas et al. |
| 10,228,654 B2 | 3/2019 | Christmas et al. |
| 10,421,392 B2 | 9/2019 | Mügge et al. |
| 10,451,742 B2 | 10/2019 | Christmas et al. |
| 10,539,288 B2 | 1/2020 | Muegge |
| 2010/0053711 A1 | 3/2010 | Haussler |
| 2012/0050830 A1 | 3/2012 | Yoon et al. |
| 2017/0030544 A1 | 2/2017 | Tsuda et al. |
| 2017/0267164 A1* | 9/2017 | Muegge .................. F21S 43/26 |
| 2018/0195680 A1* | 7/2018 | Muegge ............... G03H 1/0005 |
| 2020/0049828 A1 | 2/2020 | Christmas et al. |

FOREIGN PATENT DOCUMENTS

| | | |
|---|---|---|
| DE | 102015102243 A1 | 9/2016 |
| DE | 102015115128 A1 | 3/2017 |
| EP | 3168529 A1 | 5/2017 |

\* cited by examiner

LIGHTING APPARATUS FOR VEHICLES

This nonprovisional application is a continuation of International Application No. PCT/EP2018/075038, which was filed on Sep. 17, 2018, and which claims priority to German Patent Application No. 10 2017 122 213.8, which was filed in Germany on Sep. 26, 2017, and which are both herein incorporated by reference.

BACKGROUND OF THE INVENTION

Field of the Invention

The present invention relates to a lighting apparatus for vehicles with a housing sealed by a transparent covering panel, containing a light source unit and an optical unit for producing a predetermined light function, wherein the optical unit has a hologram element and/or a diffractive element in which diffraction information for producing the light function is contained.

Description of the Background Art

A lighting apparatus for vehicles with a housing is known from DE 10 2015 115 128 A1, which corresponds to U.S. Pat. No. 10,539,288, which is incorporated herein by reference, and in which a light source unit and an optical unit for producing a predetermined light function are arranged. A front opening of the housing is sealed by a covering panel. The optical unit has a hologram element in which diffraction information for producing the light function is contained. The hologram element, backlit by the light source unit, deflects the light striking it in accordance with the impressed diffraction structures. Since the light striking the hologram element is diffracted in light of different orders of diffraction, wherein the light of the zeroth diffraction order is undiffracted light and light of higher orders of diffraction is correspondingly stronger diffracted light, there is a possibility of designing the hologram element in such a way that almost 100% of the light in the first diffraction order is used without loss to produce the light function. However, this requires complex calculation methods and complex manufacturing processes. These hologram elements also have a relatively high wall thickness. This imposes higher demands on the bandwidth of the light source unit and on the tolerances of the entire lighting apparatus.

From DE 10 2011 051 735 A1, which corresponds to US 2012/0050830, a hologram image reproduction device for playing three-dimensional video images is known, according to which the image quality is to be improved by removing a zeroth diffraction order of the light. However, such a hologram arrangement cannot be used for lighting apparatuses for vehicles.

SUMMARY OF THE INVENTION

It is therefore an object of the present invention to develop a lighting apparatus for vehicles with an optical unit containing a hologram element and/or a diffractive element with diffraction information for producing a predetermined light function in such a way that the different light functions can be produced in a simple manner.

In an exemplary embodiment, an optical element is disposed downstream of the hologram element and/or the diffractive element in the light beam path, so that light of different orders of diffraction emerging from the hologram element and/or the diffractive element produces different light functions or illumination ranges.

An advantage of the invention is that by utilizing different orders of diffraction of the light emerging from a hologram element and/or a diffractive element, a plurality of light functions can be produced. The basic idea of the invention is to use the light of the different orders of diffraction emitted in different directions for a plurality of light functions or illumination ranges, wherein preferably light of different orders of diffraction is used for different light functions, preferably for a main illumination range and a side illumination range. For this purpose, the hologram element or the diffractive element has corresponding diffraction information. In addition, a covering panel covering the lighting apparatus is designed accordingly so that different light functions can be displayed.

The hologram element and/or the diffractive element and the covering panel can be designed in such a way that the light of the first diffraction order is used for a bright light function or a main illumination range and the light of the second and/or higher diffraction order is used for a dim light function or a side illumination range. The light of the first diffraction order can advantageously be used, for example, for a bright brake light function and the light of the second diffraction order for a relatively dim tail light function or a side marker light function, or illumination ranges of different brightness are produced for a light function, or a surface enlargement is gained by the additional side illumination range.

The hologram element and/or the diffractive element can be formed such that the light of the first diffraction order strikes in the direction of a front wall of the covering panel and the light of the second and/or higher diffraction order strikes on a side wall tapering vertically toward the front wall. Advantageously, as a result, a spatial delineation of the different light functions can take place.

The front wall and the side wall of the covering panel can be provided with a scattering optic or scattering structure or a further diffractive optic, in particular a diffractive diffuser optic, so that the light for the corresponding light functions can be scattered.

The light source unit and the hologram element or diffractive element and the covering panel can be elongated. This way, it is advantageously possible to provide a linear lighting apparatus which has a relatively narrow exit surface.

A height of the hologram element or the diffractive element may be smaller than a height of the covering panel. As a result, the light of different orders of diffraction can advantageously strike different walls of the covering panel.

The covering panel can extend with opposite side walls from a plane of the body opening of the vehicle. In this way, a three-dimensional covering panel can advantageously be created, within which space is created for, for example, a floating light function.

The covering panel can be colored red so that it can be used as a tail light for vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A lighting apparatus according to the invention for vehicles can be used in particular as a tail light. Alternatively, the lighting apparatus can also be arranged in a headlight in a front area of the vehicle. Where appropriate, the lamp can also be arranged inside the vehicle for animation purposes.

The lighting apparatus has a housing 1 in which a light source unit 2 and an optical unit 3 are arranged so as to produce a plurality of light functions. A front opening of the housing 1 is sealed by a covering panel 4 colored in red.

Figure 1:
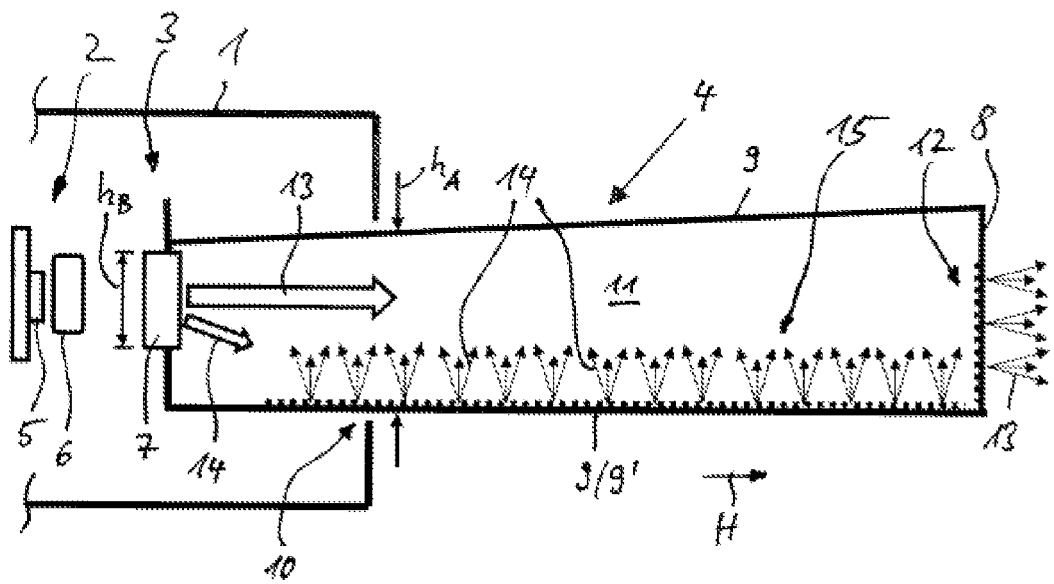
FIG. 1 illustrates a vertical section through a lighting apparatus according to the invention.
Figure 2:
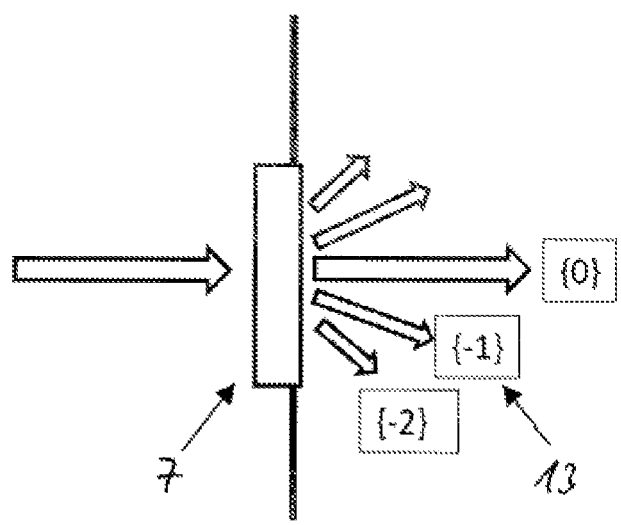
FIG. 2 illustrates a side view of a conventional hologram element with different orders of diffraction.

The lighting apparatus is elongated. For this purpose, the light source unit 2 has a plurality of light sources 5 and primary optics 6 assigned to them, which extend in the direction of extension of the lighting apparatus—essentially perpendicular to the sheet level of FIG. 1. The light sources 5 are designed as semiconductor-based light sources, in particular as LED light sources. The light sources 5 can be arranged on a common printed circuit board.

Alternatively, the light source unit can also have an elongated light guide in the direction of extension of the lighting apparatus, on the end faces of which the light sources 5 are arranged. This light guide has decoupling elements so that the light coupled in from the light sources can be coupled out in the main emission direction H.

The optical unit 3 essentially comprises a hologram element 7, which is arranged at a distance from the light source unit 2. The hologram element 7 is elongated and extends essentially in the direction of extension of the lighting apparatus, specifically parallel to the light source unit 2.

The hologram element 7 can be designed as a volume hologram element, for example in the form of an emulsion or a film. For example, the hologram element 7 can be pre-formed by deep drawing, so that it is overmolded as an insert in an injection molding tool with a transparent material that forms the flat and transparent carrier. The carrier is transparent, for example in the form of a lens. The carrier of the hologram element 7 can be attached, for example, to a holder of the housing 1, not shown.

In the present exemplary embodiment, the hologram element 7 is designed as a volume transmission hologram element. According to an alternative embodiment of the invention, the hologram element 7 can also be designed as a volume reflection hologram element. To this end, the optical unit 3 has a corresponding reflector, which is positioned such that the light emerging from the hologram element 7 can extend in the main emission direction H.

The covering panel 4 is trough-shaped with a front wall 8 at the front in the main emission direction H and with side walls 9 which project substantially perpendicularly from the front wall 8 and which extend in particular up to an opening edge 10 of the housing 1. The covering panel 4 is elongated. The side walls 9 are arranged in a region remote from the front wall 8, directly adjacent to an opening edge of the vehicle body. The covering panel 4 is thus raised to the vehicle body. It rises from a plane of the body opening of the vehicle, so that it has a three-dimensional contour course outside the vehicle. In the area of the opening edge of the vehicle body or the opening edge 10 of the housing 1, the covering panel 4 has a height $h_A$, which is larger in comparison to a height $h_B$ of the hologram element 7. The covering panel 4 surrounds an inner space 11, which can be used to produce one or more light functions.

In the present exemplary embodiment, the front wall 8 associated with the hologram element 7 downstream of the luminous flux direction has a scattering optic 12 as optics, such that light 13 of the first diffraction order is scattered from the hologram element 7 at the scattering optics 12 to produce a brake light function in a main illumination range. To this end, the hologram element 7 is structured such that the light 13 of a first diffraction order is radiated substantially in the main emission direction H or in the direction of the front wall 8. Furthermore, the hologram element 7 is structured such that light 14 of a second diffraction order is emitted laterally downwards toward a lower side wall 9'. This side wall 9' of the covering panel 4 has, as optics, a scattering optic 15 on which the light 14 is scattered in such a way that it serves to produce a side marking light function in a side illumination range.

Alternatively, a homogeneous, virtually-floating holographic light signature can also be formed as a second light function within the covering panel 4.

If the lighting apparatus is used to produce the brake light and tail light functions, the light 13 of the first diffraction order is assigned a glare device that absorbs the light 13 or allows it to pass through as a function of the presence of a brake actuator.

According to an alternative embodiment, not shown, a diffractive element can also be arranged instead of the hologram element 7, which also has structures of the magnitude of the light wavelength so that light can be diffracted from these structures.

A diffraction structure is impressed in the hologram element 7 in accordance with a predetermined spectral geometric intensity distribution function. The diffraction information can be produced by interference of the laser beams (object and reference beam) when writing the hologram element 7 due to slight differences in the refraction time. Molecules or molecular chains in the photopolymer layer are definedly aligned in accordance with the desired holographic light graphic.

According to an alternative embodiment of the invention, the covering panel 4 can also be multi-colored, in particular red and white on the one hand, red and light red or red and gray on the other.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting apparatus for vehicles, the lighting apparatus comprising:
   a housing at least partially sealed by a transparent covering panel;
   a light source unit arranged in the housing;
   an optical unit arranged in the housing for producing a predetermined light function, the optical unit comprising a hologram element or a diffractive element, in which diffraction information for the production of the light function is contained; and
   optics disposed downstream of the hologram element or the diffractive element in the light beam path, so that light of different orders of diffraction emerging from the hologram element or the diffractive element produces different light functions, wherein the optics are designed such that the light of a first diffraction order is used for bright light functions and the light of a second or higher diffraction order is used for dim light functions.

2. The lighting apparatus according to claim 1, wherein the light source unit, the hologram element or the diffractive element and the covering panel are elongated.

3. The lighting apparatus according to claim 1, wherein a height of the hologram element or the diffractive element is smaller than a height of the covering panel.

4. The lighting apparatus according to claim 1, wherein at least one of two opposite side walls of the covering panel extends in a protruding manner from a plane of a vehicle body opening.

5. The lighting apparatus according to claim 1, wherein the covering panel is formed to be monochrome red.

6. The lighting apparatus according to claim 1, wherein the covering panel is multi-colored.

7. The lighting apparatus according to claim 6, wherein the covering panel is red and white, red and light red or red and gray.

8. A lighting apparatus for vehicles, the lighting apparatus comprising:
a housing at least partially sealed by a transparent covering panel;
a light source unit arranged in the housing;
an optical unit arranged in the housing for producing a predetermined light function, the optical unit comprising a hologram element or a diffractive element, in which diffraction information for the production of the light function is contained; and
optics disposed downstream of the hologram element or the diffractive element in the light beam path, so that light of different orders of diffraction emerging from the hologram element or the diffractive element produces different light functions,
wherein the hologram element or the diffractive element is formed such that the light of a first diffraction order strikes in the direction of a front wall of the covering panel and that the light of a second or higher diffraction order strikes a side wall of the covering panel, the side wall extending in a range between the hologram element or the diffractive element and the front wall.

9. The lighting apparatus according to claim 8, wherein the front wall and the side wall of the covering panel are provided with a scattering optic as the optics.

10. A lighting apparatus for vehicles, the lighting apparatus comprising:
a housing at least partially sealed by a transparent covering panel;
a light source unit arranged in the housing;
an optical unit arranged in the housing for producing a predetermined light function, the optical unit comprising a hologram element or a diffractive element, in which diffraction information for the production of the light function is contained; and
optics disposed downstream of the hologram element or the diffractive element in the light beam path, so that light of different orders of diffraction emerging from the hologram element or the diffractive element produces different light functions,
wherein the optics are designed such that the light of a first diffraction order is used for a main illumination range and the light of a second or higher diffraction order is used for a side illumination range.

* * * * *